United States Patent [19]

Yarem et al.

[11] 4,025,001

[45] May 24, 1977

[54] PROCESS AND APPARATUS FOR THE MECHANICAL SEPARATION OF A COMBINATION OF MEATS AND BONE

[75] Inventors: Joseph Yarem, Puslinch; Werner Poss, Oakville, both of Canada

[73] Assignee: Chemetron Corporation, Chicago, Ill.

[22] Filed: Dec. 1, 1975

[21] Appl. No.: 636,424

[30] Foreign Application Priority Data

Nov. 28, 1975 Canada ................................ 240747

[52] U.S. Cl. .................................. 241/24; 241/74; 241/88
[51] Int. Cl.² ........................................ B02C 23/08
[58] Field of Search ............. 241/24, 74, 84, 84.2, 241/86, 88

[56] References Cited

UNITED STATES PATENTS

| 1,716,696 | 6/1929 | Himrod | 241/74 |
| 1,762,367 | 6/1930 | Vandergrift | 241/74 |
| 3,394,649 | 7/1968 | Kemper et al. | 241/74 |
| 3,739,994 | 6/1973 | McFarland | 241/74 |

*Primary Examiner*—Granville Y. Custer, Jr.
*Attorney, Agent, or Firm*—Hirons & Rogers

[57] ABSTRACT

In a process and apparatus for the mechanical separation of a combination of meats and bone the material is conveyed by a feed screw through a conduit having at least a part of its wall formed as a separator screen. The screw moves the material between its lands in a manner such that it is pressed radially outwards against the screen with a minimization of shear along the screen. The screen is constituted by a plurality of closely spaced plates which flex under the effect of the outwardly operative pressure to facilitate passage of the meat fraction therethrough while retaining the boney fraction on the inner wall.

8 Claims, 4 Drawing Figures

PROCESS AND APPARATUS FOR THE MECHANICAL SEPARATION OF A COMBINATION OF MEATS AND BONE

FIELD OF THE INVENTION

This invention is concerned with improvements in or relating to processes and apparatus for the mechanical separation of a combination of meats and bone.

REVIEW OF THE PRIOR ART

The mechanical separation of various meat and bone combinations to produce a high quality meat product fraction is now a well-established industry. Some parts of the industry use primarily the various parts of poultry, fish and red-meat animals that would otherwise be discarded, owing to the high cost of manual separation, but the separation of entire carcasses is also in some circumstances a viable commercial operation.

A number of different processes and apparatus have been proposed hitherto for this purpose and as examples of prior apparatus may be mentioned those disclosed in U.S. Pat. Nos. 3,396,768 (Kuribaia); 3,266,542 (Paoli); and 3,739,994 (McFarland). In all of these machines a combination of meat and small pieces of broken bone is forced under pressure against a perforated screen, the softer meat component being forced by the pressure through the screen, while the more rigid bone component is swept along the face of the screen without passing through, to a suitable discharge location.

The resulting fractions are subject to stringent regulation by the appropriate government authority and must meet minimum standards as to, for example:
 a. Maximum bone (calcium) content in the separated meat.
 b. Maximum temperature and temperature rise to which the separated meat is subjected.

In addition to these government-applied standards, the meat-processing industry which receives the product has its own standards as to bone content, homogenity, colour and texture.

DEFINITION OF THE INVENTION

It is an object of the invention to provide a new process for the mechanical separation of a meat and bone combination.

It is also an object to provide a new apparatus for the mechanical separation of a meat and bone combination.

In accordance with the present invention there is provided a process for the mechanical separation of meat and bone into separate fractions thereof comprising the steps of:
 a. providing a cylindrical conduit having an inlet end and an outlet end and containing a feed screw having a plurality of successive flights and rotatable about a longitudinal axis, at least part of the wall of the conduit surrounding the feed screw comprising a separator screen for separating the meat and bone fractions,
 b. introducing the meat and bone combination to be separated into the feed end of the conduit,
 c. operating the feed screw to move the combination through the conduit from the inlet end to the outlet end under pressure which is operative radially outwardly against the separator screen so as to force the meat fraction through the separator screen while the bone fraction is retained thereby and moved through the conduit to the outlet end,
 d. discharging the bone fraction from the outlet end and the meat fraction from the separator screen, the process being characterized by:
 e. the operation of the feed screw effects a movement of the combination between each immediately successive pair of lands comprising a leading land and a trailing land, which movement is radially outward adjacent the leading land, radially inward adjacent the trailing land, and from the trailing land to the leading land adjacent the screw body to apply the said radially outwardly operative pressure to the combination while minimizing shear of the mixture along the separator screen.

Also in accordance with the invention there is provided apparatus for the mechanical separation of meat and bone into separate fractions thereof comprising:
 a. a cylindrical conduit having an inlet end and an outlet end and containing a feed screw rotatable about a longitudinal axis,
 b. The feed screw comprising a plurality of successive lands and upon rotation about its axis moving a meat and bone combination to be separated along the conduit from the inlet to the outlet end and applying radially outwardly operative pressure to the combination pressing it against the conduit wall,
 c. at least part of the conduit wall comprising a separator screen whereby the pressure of the combination against the screen part forces the meat fraction through the screen while the bone fraction is retained thereby and moved through the conduit to the outlet end,
 d. the screw lands being shaped so that the said rotation of the screw effects a movement of the combination between each immediately successive pair of lands comprising a leading land and a trailing land, which movement is radially outward adjacent the leading land, radially inward adjacent the trailing land, and forward from the trailing land to the leading land adjacent the screw body, so that the said radially outwardly operative pressure is applied to the combination with minimization of the shear of the combination along the separator screen.

Further in accordance with the invention there is provided apparatus for the mechanical separation of meat and bone into separate fractions thereof comprising:
 a. a cylindrical conduit having an inlet end and an outlet end and containing a feed screw rotatable about a longitudinal axis,
 b. the feed screw comprising a plurality of successive lands and upon rotation about its axis moving a meat and bone combination to be separated along the conduit from the inlet to the outlet end and applying radially outwardly operative pressure to the combination pressing it against the conduit wall,
 c. at least part of the conduit wall comprising a separator screen whereby the pressure of the combination against the screen part forces the meat fraction through the screen while the bone fraction is retained thereby and moved through the conduit to the outlet end,
 d. the said part of the conduit wall constituting the separator screen comprising a plurality of plates and having screen apertures in the form of elongated slots, the plates having their inner edges constituting the inner conduit wall and flexing under the effect of the said outwardly operative pressure to facilitate passage of the meat fraction through the screen slots while retaining the bony fraction on the said inner wall.

The term "meat" as used herein is intended to apply to meat derived from any source in addition to that derived from the conventional sources cattle, pigs and poultry and, in particular, is intended to apply to meat derived from fish, crustacea, etc.

The term "combination" as used herein is intended to apply to a range of products extending from those consisting predominantly of meat with some bone included, e.g. whole carcasses, to those consisting predominantly of bone with some meat included, e.g. the bones resulting from hand deboning.

DESCRIPTION OF THE DRAWINGS

Apparatus and a process which are particular preferred embodiments of the invention will now be described, by way of example, with reference to the accompanying diagrammatic drawing, wherein.

DESCRIPTION OF THE PREFERRED EMBODIMENTS

Figures 1, 1A:
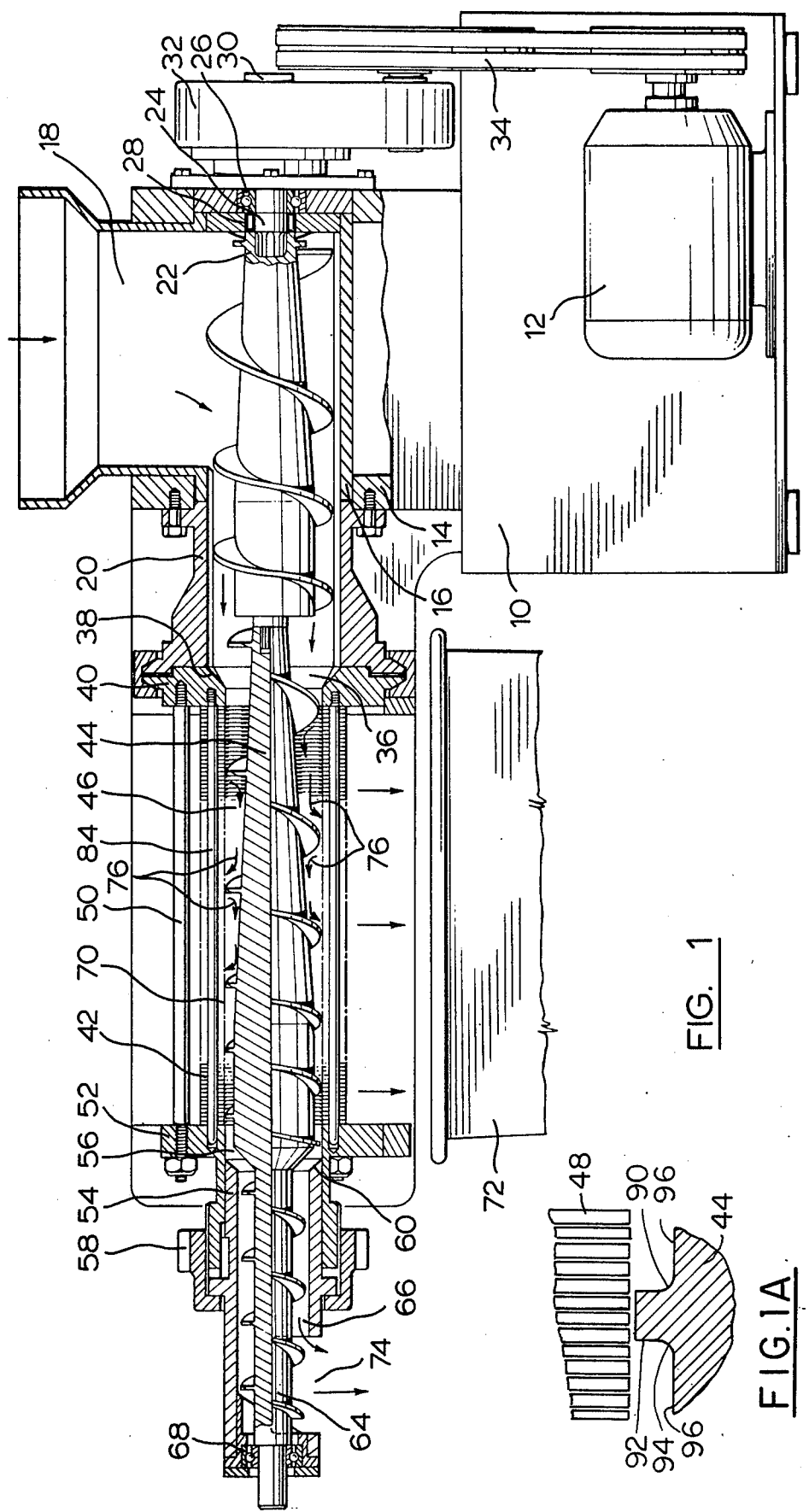
FIG. 1 is a plane cross-section through the machine taken on the axis of rotation of the conveying separating and discharge screws, the upper half of the separating and discharge screws being shown in cross-section for clarity of illustration, while the lower halves of these screws are shown in side elevation.
FIG. 1A is a section to an enlarged scale of part of one of the lands of the separating screw of FIG. 1, in order to show more clearly the shape of the root thereof.

The apparatus of the invention comprises a base, indicated generally by the reference 10, in which a drive motor 12 is mounted. On the top of the base is mounted a casing 14 having a tubular extension 16, the casing providing a hopper 18 for the reception of the meat and bone combination to be separated. The casing 14 and extension 16 also provide a conduit 20 having mounted therein a conveyor screw 22, the screw being rotatable about a horizontal longitudinal axis A—A. The rear end of the screw 22 is splined and is in rotational driving engagement with a splined boss 24 mounted in the casing by bearings 26; seals 28 are also provided. This boss is constituted by the free end of the output shaft 30 of a speed reduction gear 32, the input to the speed reduction gear being via a belt drive 34 from the drive motor 12.

This conveyor screw 22 is of conventional form and the diameter of its body increases progressively from the inlet provided by the hopper into the extension while the radial depth of its lands decreases correspondingly to maintain a constant external diameter for the whole screw; the pitch of the screw between successive lands also decreases progressively, with the result that the meat and bone combination is forced into the tubular extension and is subjected therein to an increasing pressure as it travels along the conduit 20. The pressurized combination is fed through a tapered annular outlet 36 of decreasing diameter in the direction of flow formed by inner tapered surface 38 of an annular part 40 fastened to the extension 20.

A separator screen indicated generally by reference 42 cooperates with a separating screw member 44 mounted in bore 46 therein to separate into different fractions the pressurized combination of meat and bone fed thereto by the screw 22. The separator screen is to be described in detail below, and in this embodiment is constituted by a large number of annular discs 48 (FIG. 2), which are clamped tightly fact-to-face by a set of circumferentially-spaced longitudinal tie-rods 50 extending between the part 40 and an axially-spaced tubular part 52. Another tubular part 54 is slidable within a bore 56 in the part 52 and is embraced by a cap nut 58 that is screw-threaded on to the free end of the part 52. The end of the part 54 within the bore 56 is provided with a tapered face 60 cooperating with a tapered face at the adjacent end of the screw member 44 to constitute a throttle controlling the pressure that is applied to the separating meat and bone within the cylindrical conduit 46.

The separating screw 44 has integral therewith a discharge screw 64 which rotates within a bore 66 in the part 54, the other end of the screw 64 being carried by a bearing 68.

In operation, the meat and bone combination, which may comprise, for example, the otherwise-discarded necks and backs of broiler chickens, is fed continuously to the hopper 16 and passed by the screw 22 through the conduit 20 and under pressure to the interior of the conduit 46. Under the special action of the separating screw member 44, to be described below, the combination is pressed outwardly against the cylindrical interior surface 70 of the separator screen 42. The softer meat fraction passes radially outwards through the screen and is collected in a suitable receptacle 72, while the more rigid bone, sinew, etc. fraction is carried along by the screw member 44 within the bore 46 until it is discharged through the throttle opening 66 in the part 54. The bone etc. fraction is then moved by the discharge screw 64 through the bore 66 to an outlet 74, where it is collected in a separate receptacle (now shown).

The separated meat fraction is found to have a markedly different physical structure from that produced by any of the machines at present known to us, and may be distinguished therefrom as being more coherent and not emulsified, with greater retention of the longitudinal fibrous structure characteristic of animal muscle tissue. It is believed at present that this difference in physical structure is due to the new manner in which the separator screw member 44 presents the pressurized meat and bone to the separator screen 42, and also to the new manner in which the screen is operative to separate the meat and bone fractions.

The screw 44 comprises a plurality of successive lands, and the pitch of the lands decreases progressively along its length to compensate for the loss of separated meat product through the separator screen, and so that the pressure applied to the meat and bone combination within the bore 46 is maintained within predetermined limits. Each land of helix is shaped to have the root 90 of its rear face curved so that it is arranged to direct the combination radially outwards, while the upper portion 92 of the front face of each land is shaped to direct the material it engages radially inwards toward the screw axis toward a curved root 94 between the land and the body 95 of screw 44 (see FIG. 1A). This special land shape therefore creates between each immediately successive pair of leading and trailing lands an elliptical movement of the material, with the material stationary or relatively so while it is in contact with the inner face of the separator screen. This movement, as indicated by the arrows 76, is radially outwards adjacent the leading land, radially inward adjacent the trailing land, and forward from the trailing land to the leading land adjacent the screw body, and is superimposed upon the general movement of the material lengthwise of the screw toward the outlet 56.

Another way of describing the motion is that the material is "peeled" from the surface of the separator screen by the leading face of the trailing land, and is then "tucked under" the material already against the separator screen in its movement in the direction of flow. While this movement is happening there is a constant pressure radially outward upon the material. This particular circulation, in which the part of the material in contact with the separator screen is stationary or at least relatively so, is believed to be a principal factor in the performance of the process and the apparatus. Thus, the material is forced under the radially outwardly operative pressure applied thereto against the screen with the minimum amount of shearing along the screen inner surface, and it is believed that it is this shearing which is responsible for many undesirable effects of prior mechanical separating processes and apparatus.

There is of course a tendency for the material in contact with the screen to be moved across its face by the action of the screw, and the tendency is resisted by the friction between the material and the screen surface. This friction cannot be so high that the material preferentially shears internally, since such internal shearing will again give rise to an undesirable temperature increase.

The differences in physical structure between the separated meat product of the apparatus and process of this invention shows that inherently a different separating process is involved. Owing to the special movement of the material there is no opportunity for the accumulation of particles of bone against the inner surface of the separator screen. The meat tissue separates from the bone and flows through the slots in the form of relatively long thin sheets, as compared to the "particle" emulsion or slurry structure obtained with prior apparatus and processes. Another beneficial effect which is believed to flow from this minimization of shearing in the direction of flow is the reduction of bone slivers in the meat fraction. It is found with our new process and apparatus that the temperature increase in the product in passing through the machine can be held to below the limits set by most authorities. This smaller temperature increase has a number of beneficial effects:

a. There is no requirement for the pre-cooling of the product below the temperature at which it is in any case normally stored or transported.
b. A machine of given size can be operated faster with a greater throughput of product without exceeding the specified temperature limit.
c. A reduced consumption of energy caused by friction is evidenced by the lower temperature rise.
d. A sharp temperature increase is evidence of strong forces applied to the mixture and is believed to be accompanied by damage to the cell structure that permits rapid dehydration of the resulting meat product; the meat product of the invention shows a reduced tendency to subsequent dehydration and leaching.

Figure 2:
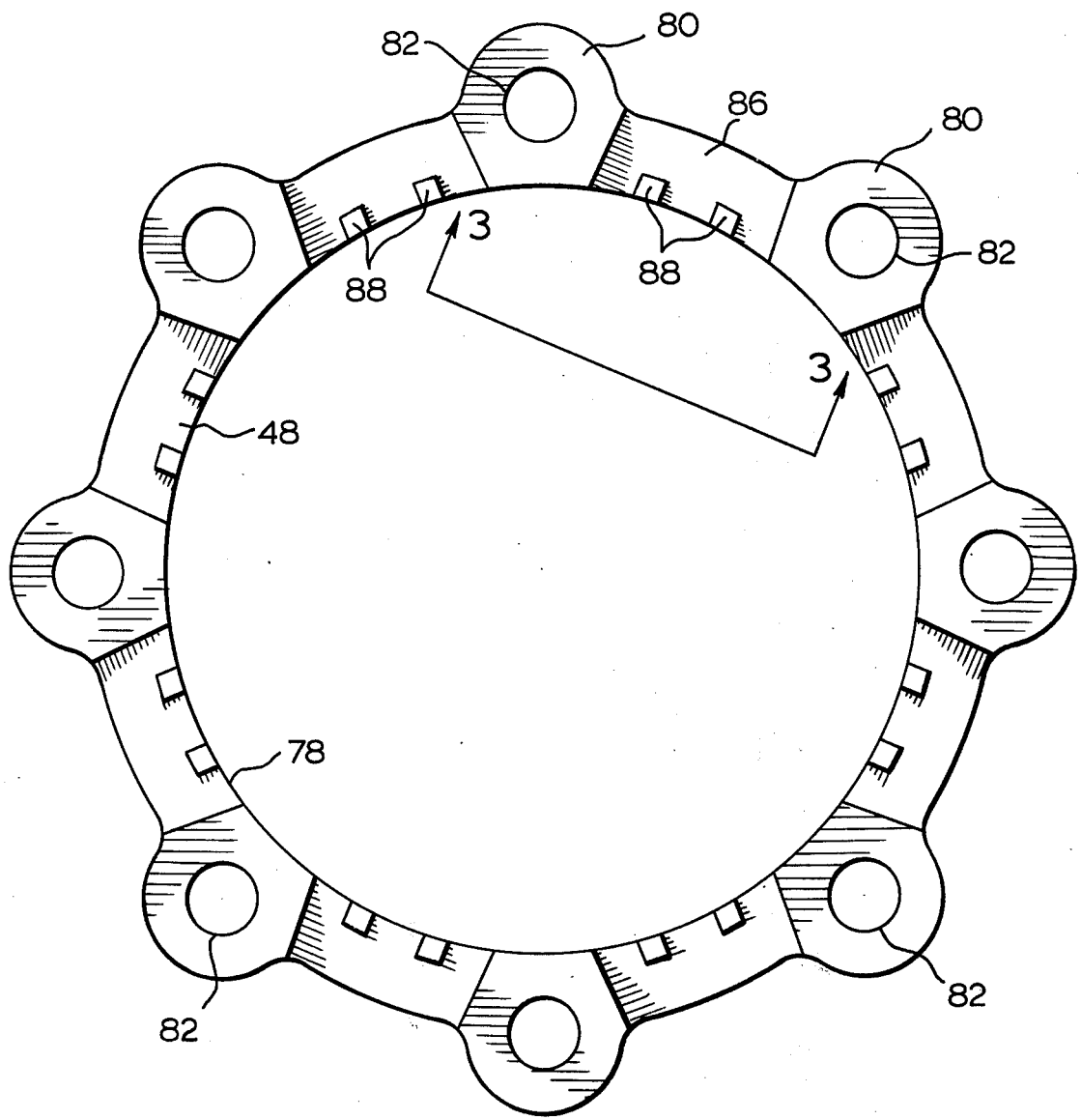
FIG. 2 is an end elevation of an annulus as used to form the separating screen of the apparatus of FIG. 1.
Figure 3:
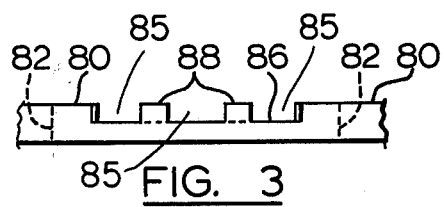
FIG. 3 is a section taken on the line 3—3 of FIG. 2.

Referring now especially to FIG. 2 of the drawings, the separator screen of the invention is made of a large number of annular plates or discs 48, one of which is illustrated by the Figure. It will be seen that each plate has an inner cylindrical face 78 forming the bore 46, while the outer face has a number of protrusions 80, each of which has a bore 82 therein for the passage of a respective locating stud 84 engaged in the members 40 and 52. The parts 86 of the ring on one side between each two immediately adjacent protrusions 80 are removed, so that the clamping of the rings face-to-face leaves a series of thin circumferential slots 85 between adjacent parts 86 through which the meat component flows to separate from the bone component, which moves through the bore to the outlet. Small portions 88 of the parts 86 are left to provide corresponding spacing elements, which will accurately maintain the axial spacing of the slots 85.

It has been found that rigidity or flexibility of the rings is of importance in obtaining a satisfactory separating action. It will be appreciated that the only parts of the disks 48 that flex are the portions of parts 86 between the spacing elements 88, and the portions of parts 86 between the elements 88 and adjacent protrusions 80. If the rings are too flexible the proportion of the bone to the meat fraction increases and bone slivers pass through, while if they are too rigid the meat content of the bone fraction immediately is increased and higher pressures must then be employed to obtain an acceptable separation, resulting in higher temperature rises, even with our improved process. Moreover, with plates that are too rigid the desirable fibrous structure is more difficult or even impossible to obtain. This flexing can be observed on the machine by direct visual inspection of the exterior of the separating section.

It is known to those skilled in the art of mechanical meat and bone separation that apertures of about 0.02 inch (0.05 cm) are required in the separating screen for adequate bone retention, and this is the usual axial dimension employed for the circumferential slots 85. However, the flexing that is possible in the plates of the apparatus of the invention appears to be highly beneficial for reasons which are not yet fully evident. It is believed at present that the flexing may permit the passage of the "sheets" of fibrous tissue through the somewhat enlarged spaces, while closing down the immediately adjacent slots somewhat to provide better bone retention.

It will be apparent that this effect cannot be achieved with the perforated screens that have been employed hitherto, comprising a large number of closely spaced holes, since there is no way in which a hole can flex to any great extent to open further with a converse effect upon immediately adjacent holes.

Put another way, it is possible that the meat of the meat fraction in such a sheet acts as a tapered wedge forcing the sides of the respective slot apart; the normal elasticity of the ring material causes it to return to its original position when this wedge has been pushed through. Pieces of bore and sinew that are of exactly the right dimension to stick in a slot of rigidly fixed width cannot do so in the screen of the invention because of this possibility of flexing.

The equivalent effect could therefore be achieved by the provision of a separator screen constituted by a large number of longitudinally disposed strips placed face-to-face, with longitudinal slots between them.

The annular discs or plates 48 may be formed from stainless steel alloy sheets (alloy 303 or 304) of thickness 0.060–0.125 inch (0.15–0.32 cm). The parts 86 may be milled to a depth of 0.015–0.02 inch (0.037–0.05 cm).

We claim:
1. A process for the mechanical separation of meat and bone into separate fractions thereof comprising the steps of:
  a. providing a cylindrical conduit having an inlet end and an outlet end and containing a feed screw having a plurality of successive flights and rotatable about a longidinal axis, at least part of the wall of the conduit surrounding the feed screw comprising a separator screen for separating the meat and bone fractions,
  b. introducing the meat and bone combination to be separated into the feed end of the conduit,
  c. operating the feed screw to move the combination through the conduit from the inlet end to the outlet end under pressure which is operative radially outwardly against the separator screen so as to force the meat fraction through the separator screen while the bone fraction is retained thereby and moved through the conduit to the outlet end,
  d. discharging the bone fraction from the outlet end and the meat fraction from the separator screen, the process being characterized by:
  e. the operation of the feed screw effects a movement of the combination between each immediately successive pair of lands comprising a leading land and a trailing land, which movement is radially outward adjacent the leading land, radially inward adjacent the trailing land, and from the trailing land to the leading land adjacent the screw body to apply the said radially outwardly operative pressure to the combination while minimizing shear of the mixture along the separator screen.

2. A process as claimed in claim 1, wherein the said separator screen is constituted by a plurality of successive slots each of which is capable of enlargement in width for passage of separated meat with consequent reduction of width of the immediately adjacent slot or slots.

3. Apparatus for the mechanical separation of meat and bone into separate fractions thereof comprising:
  a. a cylindrical conduit having an inlet end and an outlet end and containing a feed screw rotatable about a longitudinal axis,
  b. the feed screw comprising a plurality of successive lands and upon rotation about its axis moving a meat and bone combination to be separated along the conduit from the inlet to the outlet end and applying radially outwardly operative pressure to the combination pressing it against the conduit wall,
  c. at least part of the conduit wall comprising a separator screen whereby the pressure of the combination against the screen part forces the meat fraction through the screen while the bone fraction is retained thereby and moved through the conduit to the outlet end,
  d. the screw lands being shaped so that the said rotation of the screw effects a movement of the combination between each immediately successive pair of lands comprising a leading land and a trailing land, which movement is radially outward adjacent the leading land, radially inward adjacent the trailing land, and forward from the trailing land to the leading land adjacent the screw body, so that the said radially outwardly operative pressure is applied to the combination with minimization of the shear of the combination along the separator screen.

4. Apparatus as claimed in claim 3, wherein the said part of conduit wall constituting the separator screen comprises a plurality of. plates and haves screen apertures in the form of elongated slots, the plates having their inner edges constituting the inner conduit wall and flexing under the effect of the said outwardly operative pressure to facilitate passage of the meat fraction through the screen slots while retaining the bony fraction on the said inner wall.

5. Apparatus for the mechanical separation of meat and bone into separate fractions thereof comprising:
  a. a cylindrical conduit having an inlet end and an outlet end and containing a feed screw rotatable about a longitudinal axis,
  b. the feed screw comprising a plurality of successive lands and upon rotation about its axis moving a meat and bone combination to be separated along the conduit from the inlet to the outlet end and applying radially outwardly operative pressure to the combination pressing it against the conduit wall,
  c. at least part of the conduit wall comprising a separating screen whereby the pressure of the combination against the screen part forces the meat fraction through the screen while the bone fraction is retained thereby and moved through the conduit to the outlet end,
  d. the said part of the conduit wall constituting the separator screen comprising a plurality of plates and having screen apertures in the form of elongated slots, the plates having their inner edges constituting the inner conduit wall and flexing under the effect of the said outwardly operative pressure to facilitate passage of the meat fraction through the screen slots while retaining the bony fraction on the said inner wall.

6. Apparatus as claimed in claim 5, wherein the said plates comprise a plurality of annular rings clamped face to face and coaxial with the axis of rotation of the feed screw and the elongated slots extend circumferentially of the feed screw.

7. Apparatus as claimed in claim 6, wherein the said plates are of stainless steel of thickness 0.060 to 0.125 inch.

8. Apparatus as claimed in claim 7, wherein the slots in the screen through which the meat fraction passes are of an axial dimension of about 0.015 to 0.02 inch.

* * * * *

UNITED STATES PATENT OFFICE
CERTIFICATE OF CORRECTION

Patent No. 4,025,001    Dated 24th May, 1977

Inventor(s) Joseph Yarem; Werner Poss

It is certified that error appears in the above-identified patent and that said Letters Patent are hereby corrected as shown below:

Column 2, line 22 - alter "The" to - the -

Column 4, line 11 - alter "fact" to - face - line 43 - alter "now" to - not - line 63 - before "helix" insert - the -

Column 7, line 17 - alter "longidinal" to - longitudinal -

Column 8, line 17 - before "conduit" insert - the - line 18 - alter "haves" to - has -

Signed and Sealed this

Twenty-fifth Day of October 1977

[SEAL]

Attest:

RUTH C. MASON
Attesting Officer

LUTRELLE F. PARKER
Acting Commissioner of Patents and Trademarks